United States Patent [19]

Mori et al.

[11] Patent Number: 5,665,482
[45] Date of Patent: Sep. 9, 1997

[54] FLUORITE STRUCTURE TYPE CERIA TYPE SOLID ELECTROLYTE

[75] Inventors: Toshiyuki Mori, Tsuchiura; Hideto Kuramochi; Hiroshi Yamamura, both of Tsukuba, all of Japan

[73] Assignee: Tosoh Corporation, Shinnanyo, Japan

[21] Appl. No.: 582,417

[22] Filed: Jan. 3, 1996

[30] Foreign Application Priority Data

Jan. 10, 1995 [JP] Japan ................................. 7-002026

[51] Int. Cl.$^6$ .......................................... H01M 8/10
[52] U.S. Cl. ............................ 429/33; 429/191; 429/193; 429/206; 252/521; 252/62.2; 501/152; 204/421; 204/295
[58] Field of Search ................................ 204/421, 295; 429/30, 33, 46, 191, 193, 206; 252/521, 62.2, 187.1; 501/152

[56] References Cited

U.S. PATENT DOCUMENTS

| | | | |
|---|---|---|---|
| 5,001,021 | 3/1991 | Maricle et al. | 429/193 |
| 5,244,753 | 9/1993 | Taniguchi et al. | 429/33 |
| 5,387,330 | 2/1995 | Taniguchi et al. | 429/33 |

FOREIGN PATENT DOCUMENTS

| | | |
|---|---|---|
| WO 91/09430 | 6/1991 | WIPO . |
| WO 93/16966 | 9/1993 | WIPO . |

OTHER PUBLICATIONS

Journal of the Electrochemical Society, vol. 122, No. 1, pp. 142–147, Jan. 1975, Tetsuichi Kudo, et al., "Oxygen Ion Conduction of the Fluorite-Type $Ce_{1-x}Ln_xO_{2-x/2}$".

Solid State Ionics, vol. 52, No. 1/03, pp. 165–172, May 1, 1992, K. Eguchi, et al., "Electrical Properties of Ceria–Based Oxides and Their Application to Solid Oxide Fuel Cells".

Journal of Applied Electrochemistry, vol. 18, pp. 527–531, 1988, Hidenori Yahiro, et al., "Oxygen Ion Conductivity of the Ceria–Sammarium Oxide System with Flourite Structure"No month available.

Solid State Ionics, vol. 52, No. 1/03, pp. 173–182, May 1, 1992, D.L. Maricle, et al., "Enhanced Ceria—A Low—Temperature SOFC Electrolyte".

Database WPI, Derwent Publication, AN–75–38647W [23], JP–B–50 012 566, May 13, 1975.

Database WPI Derwent Publication, AN–72–25667T, JP–B–47 012 105 No month/year available.

Chemical Abstracts, vol. 116, No. 20, May 18, 1992, N.A. Likhomanova, et al., "Preparation of Cerium (IV) Oxide–Strontium Oxide–Based Electrolytes".

Chemical Abstracts, vol. 124, No. 12, Mar. 18, 1996, Guangyu Chen, et al., "Study on Solid Electrolytes (CE02)0.7–x(MO)x(La2O3)0.3 (M=MG, Ca, Sr) and Their Properties".

*Primary Examiner*—Bruce F. Bell
*Attorney, Agent, or Firm*—Oblon, Spivak, McClelland, Maier & Neustadt, P.C.

[57] ABSTRACT

A defective fluorite structure type solid electrolyte of the following formula (1):

$$\{(M_{1-a}A_a)_xCe_{1-x}\}O_{2-y} \quad (1)$$

wherein M is a trivalent rare earth element other than Ce, A is a monovalent alkali metal or a bivalent alkaline earth metal, and a, x and y are $0<a<0.6$, $0.2<x<0.5$ and $0<y<0.55$, respectively.

12 Claims, 1 Drawing Sheet

FLUORITE STRUCTURE TYPE CERIA TYPE SOLID ELECTROLYTE

The present invention relates to a fluorite structure type ceria type solid electrolyte material which has a large quantity of oxygen vacancies and which exhibits high oxygen ionic conductivity even in a strongly reducing atmosphere.

BACKGROUND OF THE INVENTION $CeO_2$ belongs to a fluorite structure type compound and is known to become a solid electrolyte material showing high oxygen ionic conduction, when a trivalent rare earth element (such as Y, Sm or Nd) is solid-solubilized at tetravalent Ce sites to introduce oxygen vacancies (H. Yahiro, Y. Baba, K. Eguchi and H. Arai, J. Electrochem. Soc., vol. 135, 2077–80 (1988), and T. Inoue, T. Setoguchi, K. Eguchi and H. Arai, Solid State Inonics. vol. 36, 71–75 (1989)).

In such a defective ceria type solid electrolyte, oxygen vacancies are formed by substituting and solid-solubilizing a trivalent rare earth element at tetravalent Ce sites. However, if the amount of the trivalent element for solid solubilization is increased in order to increase the quantity of oxygen vacancies, a C type rare earth compound tends to form, and the conductivity tends to decrease by the formation of such a compound, whereby it has been difficult to improve the oxygen ionic conductivity.

Further, the defective ceria type solid electrolyte has had a drawback that $Ce^{4+}$ in $CeO_2$ is readily reduced to $Ce^{3+}$ in a reducing atmosphere, whereby not only the oxygen ionic conductivity but also electric conductivity will appear. If the electric conductivity becomes remarkably high, when the electrolyte is used as a cell material for a fuel cell, the power density tends to decrease. The susceptivity to reduction of $Ce^{4+}$ under such a working condition of a fuel cell has been a serious problem which hinders practical application of the defective ceria type solid electrolyte.

The present invention has been made in view of such a problem, and it is an object of the present invention to provide a fluorite structure type ceria type solid electrolyte which has ionic conductivity and reduction resistance of $Ce^{4+}$ substantially improved over the conventional electrolytes and which shows an excellent power density when used as a cell material for a fuel cell.

SUMMARY OF THE INVENTION

The present inventors have conducted extensive studies to solve the above problem. As a result, they have found:

(1) that the trivalent rare earth element sites are further partly substituted by solid solubilization of a monovalent or bivalent element, so that the trivalent rare earth element sites are made to have a lower valency of less than trivalent as the average valency, whereby formation of a C type rare earth compound which is a solid solution of a rare earth oxide and $CeO_2$ and which causes deterioration of the conductivity, is suppressed, the quantity of oxygen vacancies is increased, and the monovalent or bivalent elements having an ionic radius larger than Y is solid-solubilized to expand the lattice and to increase the space in the crystal lattice to permit oxygen ions to pass therethrough; and (2) that, based on a belief that there is an interrelation between the unstability of the defective ceria type compound and the quantity of oxygen vacancies, if a large quantity of oxygen vacancies have been introduced, to succeed in minimizing the change of the defective ceria type compound from tetravalent to trivalent even in a reducing atmosphere, it is possible to provide a solid electrolyte material having high oxygen ionic conductivity, which has overcome the drawback of susceptivity to reduction which used to be a serious problem which has hindered practical application of the defective ceria type solid electrolyte, and at the same time, it is possible to obtain an excellent power density when such an electrolyte material is used as a cell material for a fuel cell. The present invention has been accomplished on the basis of these discoveries.

That is, the present invention provides a defective fluorite structure type solid electrolyte of the following formula (1):

  (1)

wherein M is a trivalent rare earth element other than Ce, A is a monovalent alkali metal or a bivalent alkaline earth metal, and a, x and y are 0<a<0.6, 0.2<x<0.5 and 0<y<0.55, respectively;

a defective fluorite structure type solid electrolyte of the following formula (2):

  (2)

wherein M is a trivalent rare earth element other than Ce, A is a monovalent alkali metal or a bivalent alkaline earth metal, and α, a, x and y are 0.4<α<1, 0<a<0.1, 0.2<x<0.5 and 0<y<0.26, respectively;

a defective fluorite structure type solid electrolyte of the following formula (3):

  (3)

wherein M is a trivalent rare earth element other than Ce, each of A and B is a monovalent alkali metal or a bivalent alkaline earth metal, provided A≠B, and a, x, b and y are 0<a<0.6, 0.1<x<0.4, 0<b<0.4 and 0<y<0.8, respectively; and a defective fluorite structure type solid electrolyte of the following formula (4):

  (4)

wherein M is a trivalent rare earth element other than Ce, each of A and B is a monovalent alkali metal or a bivalent alkaline earth metal, provided that A≠B, and α, a, x, β, b and y are 0.4<α<1, 0<a<0.1, 0.1<x<0.4, 0.6<β<1, 0<b<0.1 and 0<y<0.41, respectively.

In the accompanying drawing, FIG. 1 shows the relation between the oxygen partial pressure and the quantity of oxygen vacancies as observed with a ceria type oxide.

Now, the present invention will be described in detail with reference to the preferred embodiments.

The $CeO_2$ type solid electrolyte of the present invention is a defective fluorite structure type solid electrolyte represented by any one of the above formulas (1) to (4).

In the following formula (1):

  (1)

M is a trivalent rare earth element other than Ce and is not particularly limited. Among these rare earth elements, an element having an ionic radius within a range of from 0.97 to 1.20 Å in eightfold coordination is preferred. In the case of an element having an ionic radius of less than 0.97 Å in eightfold coordination, since this 0.97 Å is the ionic radius of $Ce^{4+}$ in eightfold coordination, the crystal lattice shrinks so much that the ionic conduction will be hindered. On the other hand, in the case of an element having an ionic radius exceeding 1.20 Å, the ionic radius differs substantially from the ionic radius of $Ce^{4+}$ in eightfold coordination, whereby the crystal lattice deforms so much that ionic conduction will be hindered also in this case.

Specific examples of M include Lu(0.97), Yb(0.98), Tm(0.99), Er(1.00), Y(1.015), Ho(1.02), Dy(1.03) Gd(1.06), Eu(1.07), Sm(1.09) and Nd(1.12). The numerals in the parenthesis indicate ionic radii in eightfold coordination.

In the above formula (1), A is a monovalent alkali metal or a bivalent alkaline earth metal.

In the above formula (1), a value of a is $0<a<0.6$. If the value of a is 0, the quantity of oxygen vacancies will be small, whereby no adequately high oxygen ionic conduction can be obtained. On the other hand, if the value of a is 0.6 or higher, the monovalent or bivalent element can not be solid-solubilized at Ce sites, tends to precipitate at grain boundaries and is likely to react with a glass phase contained in a small amount in the starting material to increase electric resistance at the grain boundaries, whereby the overall oxygen ionic conductivity of the electrolyte will be lowered, such being undesirable.

In the above formula (1), the value of x is $0.2<x<0.5$. If the value of x is 0.2 or less, the quantity of active oxygen vacancies tends to be inadequate, and no adequately high oxygen ionic conduction can be obtained. On the other hand, if the value of x is 0.5 or higher, the quantity of oxygen vacancies increases, but the amount of $M_2O_3$ solid-solubilized in $CeO_2$ increases, whereby the lattice will shrink, which negates the effect of expanding the lattice by solid solubilization of the monovalent or bivalent element. Consequently, the pathway for mobile ions present in a large amount will be narrowed, and the ionic conductivity will substantially be lowered, such being undesirable.

In the above formula (1), the value of y is determined so as to balance the values of the positive and negative charges when the values for the above a and x are determined. Usually, the value is $0<y<0.55$.

In the case of $0<a<0.1$ in the above formula (1), A/M representing the quantitative relation between M and A is not limited to $a/(1-a)$, and A/M may be $a/\alpha$ and $0.4<\alpha<1$.

Namely, in the following formula (2):

$$\{(M_\alpha A_a)_x Ce_{1-x}\}O_{2-y} \quad (2)$$

M is a trivalent rare earth element other than Ce and is not particularly limited. Among these rare earth elements, an element having an ionic radius within a range of from 0.97 to 1.20 Å in eightfold coordination, is preferred. In the case of an element having an ionic radius of less than 0.97 Å in eightfold coordination, since such 0.97 Å is the ionic radius of $Ce^{4+}$ in eightfold coordination, the crystal lattice shrinks so much that the ionic conduction will be hindered. On the other hand, in the case of an element having an ionic radius of more than 1.20 Å, the ionic radius differs substantially from the ionic radius of $Ce^{4+}$ in eightfold coordination, whereby the crystal lattice deforms so much that the ionic conduction will be hindered also in this case.

Specific examples of M include Lu(0.97), Yb(0.98), Tm(0.99), Er(1.00), Y(1.015), Ho(1.02), Dy(1.03), Gd(1.06), Eu(1.07), Sm(1.09) and Nd(1.12). The numerals in the parenthesis indicate ionic radii in eightfold coordination.

In the above formula (2), A is a monovalent alkali metal or a bivalent alkaline earth metal.

In the above formula (2), the value of a is $0<a<0.1$, and the value of $\alpha$ is $0.4<\alpha<1$. It is believed that when the amount of solid-solubilized a is small, it is possible to form a fluorite structure even if the A/M ratio becomes relatively wide, and it is possible to improve the ionic conductivity by effectively utilizing a very small quantity of oxygen vacancies.

In the above formula (2), the value of x is $0.2<x<0.5$. If the value of x is 0.2 or less, the quantity of active oxygen vacancies tends to be inadequate, whereby no adequately high oxygen ionic conduction can be obtained. On the other hand, if the value of x is 0.5 or higher, the quantity of oxygen vacancies increases, but the amount of $M_2O_3$ solid-solubilized in $CeO_2$ increases, whereby the lattice will shrink, which negates the effect of expanding the lattice by solid solubilization of the monovalent or bivalent element. Consequently, the pathway for mobile ions present in a large amount will be narrowed, and the ionic conductivity will be substantially lowered, such being undesirable.

In the above formula (2), the value of y which is determined from the balance of the positive and negative charges, is $0<y<0.26$.

Now, in the following formula (3):

$$\{(M_{1-a}A_a)_x(Ce_{1-b}B_b)_{1-x}\}O_{2-y} \quad (3)$$

M is a trivalent rare earth element other than Ce and is not particularly limited. Among these rare earth elements, an element having an ionic radius within a range of from 0.97 to 1.20 Å in eightfold coordination is preferred. In the case of an element having an ionic radius of less than 0.97 Å in eightfold coordination, since such 0.97 Å is the ionic radius of $Ce^{4+}$ in eightfold coordination, crystal lattice shrinks so much that the ionic conduction will be hindered. On the other hand, in the case of an element having an ionic radius exceeding 1.20 Å, the ionic radius substantially differs from the ionic radius of $Ce^{4+}$ in eightfold coordination, and the crystal lattice will be deformed so much that the ionic conduction will be hindered also in this case.

Specific examples of M include Lu(0.97), Yb(0.98), Tm(0.99), Er(1.00), Y(1.015), Ho(1.02), Dy(1.03), Gd(1.06), Eu(1.07), Sm(1.09) and Nd(1.12). Here, the numerals in the parenthesis indicate ionic radii in eightfold coordination.

In the above formula (3), each of A and B is a monovalent alkali metal or bivalent alkaline earth metal, provided $A \neq B$.

In the above formula (3), the value of a is $0<a<0.6$. If the value of a is 0, the quantity of oxygen vacancies is small, and no adequately high oxygen ionic conduction can be obtained. On the other hand, if the value of a is 0.6 or higher, the monovalent or bivalent element can not be completely solid-solubilized at Y sites, will precipitate at grain boundaries and will react with a glass phase contained in a small amount in the starting material, whereby the electric resistance at the grain boundaries will be increased, and the overall oxygen ionic conductivity of the electrolyte will be lowered, such being undesirable.

In the above formula (3), the value of x is $0.1<x<0.4$. If the value of x is 0.1 or lower, the quantity of active oxygen vacancies tends to be inadequate, and no adequately high oxygen ionic conductivity can be obtained. On the other hand, if the value of x is 0.4 or higher, the quantity of oxygen vacancies increases, but the amount of $Y_2O_3$ solid-solubilized in $CeO_2$ increases, whereby the lattice will shrink, which negates the effect of expanding the lattice by solid-solubilization of the monovalent or bivalent element. Consequently, the pathway for mobile ions present in a large amount, will be narrowed, whereby the ionic conductivity will substantially be lowered, such being undesirable.

In the above formula (3), the value of b is $0<b<0.4$. If the value of b is 0, except for the case corresponding to claim 1, the conductivity decreases for the above mentioned reason, such being undesirable. On the other hand, if the value of b is 0.4 or higher, the monovalent or bivalent element can not be completely solid-solubilized at the Ce sites, will precipitate at grain boundaries and will react with a glass phase contained in a small amount in the starting material, whereby the electric resistance at the grain boundaries will be increased, and the overall oxygen ionic conductivity of the electrolyte will be lowered, such being undesirable.

In the above formula (3), the value of y is determined to balance the positive and negative charges at the time of determining the values for the above a and x, and it is usually $0<y<0.8$.

When $0<a<0.1$ and $0<b<0.1$ in the above formula (3), A/M and B/Ce representing the quantitative relation between M and A and between Ce and B, are not limited to $a/(1-a)$ and $b/(1-b)$, and A/M may be $a/\alpha$ and $0.4<\alpha<1$, and B/Ce may be $b/\beta$ and $0.6<\beta<1$.

Namely, in the following formula (4):

$$\{(M_\alpha A_a)_x(Ce_\beta B_b)_{1-x}\}O_{2-y} \qquad (4)$$

M is a trivalent rare earth element other than Ce and is not particularly limited. Among these rare earth elements, an element having an ionic radius within a range of from 0.97 to 1.20 Å in eightfold coordination is preferred. In the case of an element having an ionic radius of less than 0.97 Å in eightfold coordination, since such 0.97 Å is the ionic radius of $Ce^{4+}$ in eightfold coordination, the crystal lattice shrinks so much that the ionic conduction will be hindered, such being undesirable. On the other hand, in the case of an element having an ionic radius exceeding 1.20 Å, the ionic radius substantially differs from the ionic radius of $Ce^{4+}$ in eightfold coordination, whereby the crystal lattice will deform so much that the ionic conduction will be hindered also in this case.

Specific examples of M include Lu(0.97), Yb(0.98), Tm(0.99), Er(1.00), Y(1.015), Ho(1.02), Dy(1.03), Gd(1.06), Eu(1.07), Sm(1.09) and Nd(1.12). Here, the numerals in the parenthesis indicate ionic radii in eightfold coordination.

In the above formula (4), each of A and B is a monovalent alkali metal or a bivalent alkaline earth metal, provided $A \neq B$.

In the above formula (4), values of $\alpha$, a, $\beta$ and b are $0.4<\alpha<1$, $0<a<0.1$, $0.6<\beta<1$ and $0<b<0.1$, respectively. It is believed that in a case where the amount of solid-solubilized A and/or B is small, it is possible to form a fluorite structure even if the A/M ratio and the B/Ce ratio become relatively wide, and it is possible to improve the ionic conductivity by effectively utilizing a very small quantity of oxygen vacancies.

In the above formula (4), the value of x is $0.1<x<0.4$. If the value of x is 0.1 or less, the quantity of active oxygen vacancies tends to be inadequate, and no adequately high oxygen ionic conductivity can be obtained. On the other hand, if the value of x is 0.4 or higher, the quantity of oxygen vacancies increases, but amount of $Y_2O_3$ solid-solubilized in $CeO_2$ increases, whereby the lattice will shrink, which negates the effect of expanding the lattice by solid solubilization of the monovalent or bivalent element. Consequently, the pathway for mobile ions present in a large amount will be narrowed, whereby the ionic conductivity will be substantially lowered, such being undesirable.

In the above formula (4), the value of y determined from the balance of the positive and negative charges, is $0<y<0.41$.

By selecting one of the compositions of the above formulas (1) to (4), it is possible to prepare a high ionic conductor composed or a fluorite single phase.

The method for preparing the solid electrolyte of the invention is not particularly limited. For example, it may be prepared by a method wherein oxides are used as the starting material powders, and they are mixed by dry and wet mixing, followed by calcining, or a method wherein an aqueous solution of an inorganic salt is used as the starting material, oxalic acid or the like is used as a precipitating agent to obtain a precipitate as a carbonate, and the precipitate is collected by filtration, dried and then calcined, or a method wherein an alkoxide method using an alkoxide solution as the starting material, is employed to conduct liquid phase mixing, followed by hydrolysis to prepare a precipitate, and the precipitate is collected by filtration, dried and then calcined.

The mechanism for the effect of the present invention has not yet been fully understood. However, it is believed that in a case where a trivalent rare earth element is simply solid-solubilized in $CeO_2$, if oxygen vacancies are increased, a C type rare earth compound will be formed, and the conductivity will be lowered, but by substituting and solid-solubilizing a monovalent or bivalent element partly at the trivalent rare earth element sites, the quantity of oxygen vacancies can be increased without permitting a C type rare earth compound to form, and the oxygen ionic conductivity will be improved by the effects of increasing the bottleneck diameter due to an increase of the volume of the lattice.

Further, the reason for overcoming the drawback of the conventional ceria type solid electrolyte such that $Ce^{4+}$ in $CeO_2$ is readily reduced to $Ce^{3+}$ in a strongly reducing atmosphere, can be explained from the relation between the unstability of the ceria type oxide and the quantity of oxygen vacancies.

BRIEF DESCRIPTION OF THE DRAWING

The relation between the oxygen partial pressure and the quantity of oxygen vacancies as observed in the ceria type oxide is schematically shown in FIG. 1.

DETAILED DESCRIPTION OF THE PREFERRED EMBODIMENTS

Figure 1:
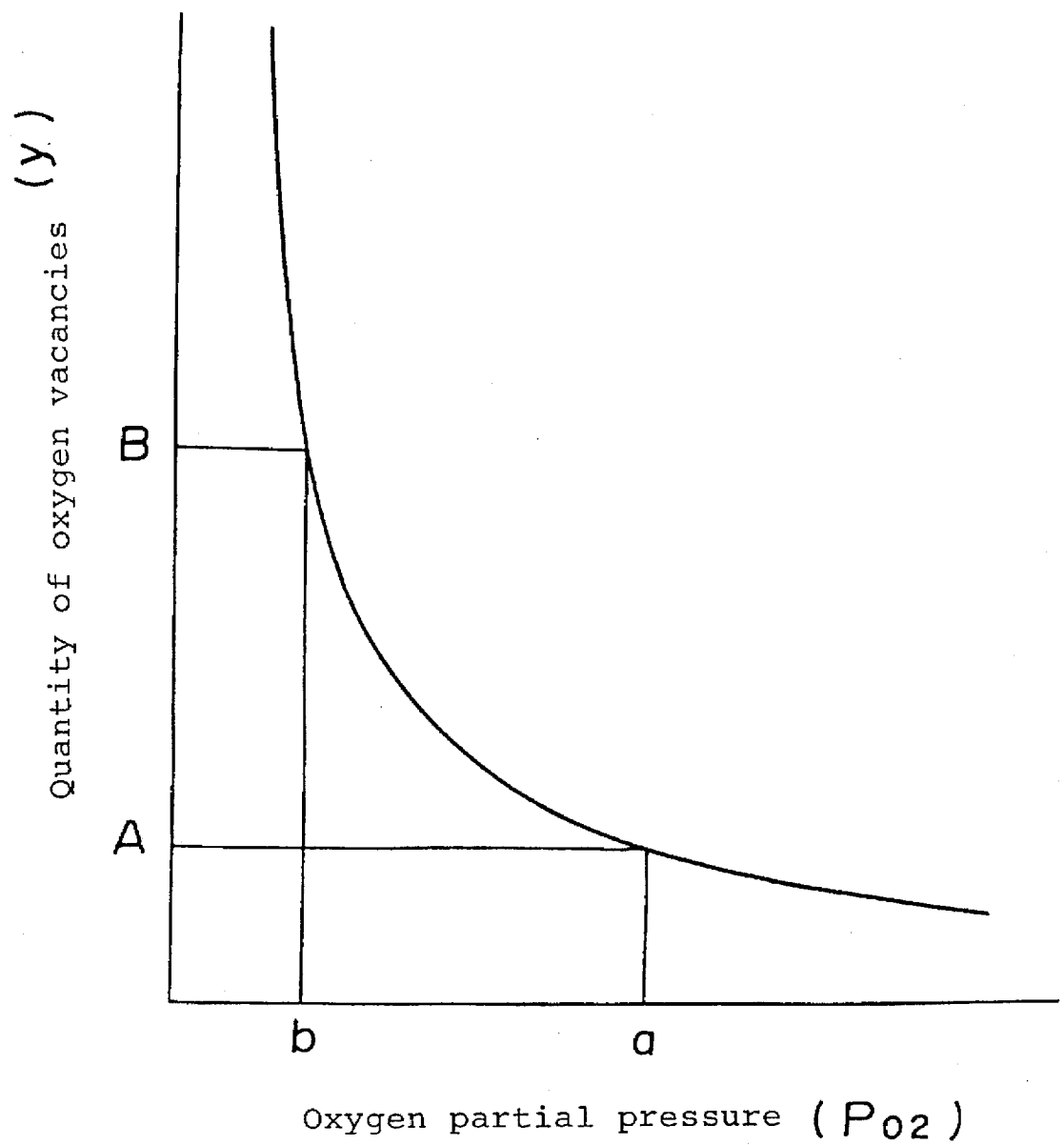

As shown in FIG. 1, if the oxygen partial pressure decreases, i.e. to a reduced state, the quantity of oxygen vacancies in the ceria type oxide tends to increase, such oxygen vacancies have a positive charge, and accordingly, to compensate the increase of such oxygen vacancies to maintain the electrical neutrality of the ceria type compound itself, the valency is reduced from $Ce^{4+}$ to $Ce^{3+}$. This is believed to be the reason for the susceptivity to reduction of $Ce^{4+}$ in $CeO_2$ to $Ce^{3+}$. Here, an attention is drawn to point A in FIG. 1. With the material having oxygen vacancies in a quantity shown at point A, if the oxygen partial pressure value of a is lowered, further oxygen vacancies will be generated, and at the same time, the valency of Ce partially decreases. Accordingly, by preliminarily introducing a large amount of oxygen vacancies to point B in FIG. 1, there will be no necessity to lower the valency of Ce to a lower oxygen partial pressure (point b), and high ionic conductivity is maintained even under a reducing atmosphere, and it is possible to exhibit an excellent power density when such a material is used as a cell material for a fuel cell.

As described in the foregoing, the present invention relates to a fluorite structure type ceria type solid electrolyte having a large quantity of oxygen vacancies, and it is possible to obtain a novel solid electrolyte utilizing the function of such oxygen vacancies.

Now, the present invention will be described in further detail with reference to Examples. However, it should be understood that the present invention is by no means restricted by such specific Examples.

EXAMPLES 1 TO 16

In order to obtain blends corresponding to the following 16 kinds of chemical formulas, yttrium oxide powder (manufactured by Shin-Etsu Chemical Co., Ltd.), yttrium oxide (manufactured by Kishida Chemical Co., Ltd.), samarium oxide (manufactured by Kishida Chemical Co., Ltd.), gadolinium oxide (manufactured by Kishida Chemical Co., Ltd.), cesium carbonate powder (manufactured by Kishida Chemical Co., Ltd.), sodium carbonate (manufactured by Kishida Chemical Co., Ltd.), strontium carbonate (manufactured by Kishida Chemical Co., Ltd.), cerium oxide powder (manufactured by Mitsuwa Chemical Co., Ltd.) and litium oxide powder (manufactured by Kishida Chemical Co., Ltd.) were mixed in ethanol by a ball mill, and the blends were calcined at 1000° C. for one hour in air. The powders thereby obtained were formed into pellets by cold isostatic press under 2 t/cm². The obtained samples were sintered at 1500° C. for 4 hours in air to obtain sintered bodies of cubic system fluorite single phase.

Example 1: $\{(Y_{0.5}Na_{0.5})_{0.4}Ce_{0.6}\}O_{1.6}$
Example 2: $\{(Y_{0.5}Cs_{0.5})_{0.3}Ce_{0.7}\}O_{1.7}$
Example 3: $\{(Y_{0.5}Cs_{0.5})_{0.3}(Ce_{0.67}Li_{0.33})_{0.7}\}O_{1.35}$
Example 4: $\{(Y_{0.5}Cs_{0.5})_{0.2}(Ce_{0.67}Li_{0.33})_{0.8}\}O_{1.4}$
Example 5: $\{(Y_{0.5}Sr_{0.5})_{0.4}Ce_{0.6}\}O_{1.7}$
Example 6: $\{(Y_{0.4}Na_{0.6})_{0.4}Ce_{0.6}\}O_{1.56}$
Example 7: $\{(Y_{0.4}Na_{0.6})_{0.3}(Ce_{0.67}Li_{0.33})_{0.7}\}O_{1.38}$
Example 8: $\{(Yb_{0.5}Cs_{0.5})_{0.4}Ce_{0.6}\}O_{1.6}$
Example 9: $\{(Gd_{0.5}Cs_{0.5})_{0.4}Ce_{0.6}\}O_{1.6}$
Example 10: $\{(Sm_{0.5}Cs_{0.5})_{0.4}Ce_{0.6}\}O_{1.6}$
Example 11: $\{(Gd_{0.5}Cs_{0.5})_{0.3}(Ce_{0.67}Li_{0.33})_{0.7}\}O_{1.35}$
Example 12: $\{(Sm_{0.5}Cs_{0.5})_{0.3}(Ce_{0.67}Li_{0.33})_{0.7}\}O_{1.35}$
Example 13: $\{(Sm_{0.5}Cs_{0.09})_{0.3}(Ce_{0.67}Li_{0.08})_{0.7}\}O_{1.20}$
Example 14: $\{(Sm_{0.5}Cs_{0.01})_{0.3}(Ce_{0.67}Li_{0.01})_{0.7}\}O_{1.66}$
Example 15: $\{(Sm_{0.5}Cs_{0.09})_{0.4}Ce_{0.6}\}O_{1.52}$
Example 16: $\{(Sm_{0.5}Cs_{0.01})_{0.4}Ce_{0.6}\}O_{1.50}$ However, the oxygen number in each of the above formulas is the value obtained by calculation from the balance of the positive and negative charges.

To each of the obtained sintered bodies, platinum electrodes were coated, and the coated electrodes were calcined at 1000° C., whereupon the complex impedance was measured by an alternate current two terminal method and the ionic conductivity was calculated by the following formula.

Ionic conductivity: $\log\sigma = \log\{Z\cos\theta/(1.S^{-1})\}$ where σ is the conductivity (ionic conductivity is shown as a logarithm of this value), Z is the impedance, θ is the delay angle, 1 is the thickness of the pellet, and S is the platinum electrode area on the pellet.

Further, in order to evaluate the reduction in a highly reducing atmosphere, the oxygen ion transport number was measured by an electromotive force method using an oxygen concentration cell. The oxygen ion transport number (ti) is calculated by the following formula:

$ti = Em/Et$

Em is the electromotive force measured, and Et is the theoretical electromotive force.

Further, the theoretical electromotive force is calculated by the following formula.

$Et = (RT/4F)\ln(P''_{o2}/P'_{o2})$ where T is the absolute temperature, R is the gas constant, F is the Faraday constant, $P''_{o2}$ and $P'_{o2}$ are the oxygen partial pressures at both poles of the concentration cell, respectively.

The ion transport number at 950° C. was measured under the two environmental conditions i.e. a case where one pole of the concentration cell is oxygen, and the other pole is air, i.e.

$\log(P''_{o2}/P'_{o2}) = -1$ and a case where one pole is oxygen and the other pole is hydrogen, i.e.

$\log(P''_{o2}/P'_{o2}) = -21.$ ti takes a value of $0 \leq ti \leq 1$. As the value is closer to 1, the electron conductivity becomes smaller. In each atmosphere, the one having a high ion transport number, is excellent in the reducing resistance.

In Table 1, the conductivity and the oxygen ion transport number at 950° C. are shown.

TABLE 1

| | Conductivity | Transport number $\log(P''_{o2}/P'_{o2})$ | |
|---|---|---|---|
| | $(S \cdot cm^{-1})$ | $-1$ | $-21$ |
| Example 1 | −0.1 | 0.95 | 0.91 |
| Example 2 | −0.3 | 1.00 | 0.90 |
| Example 3 | −0.1 | 0.98 | 0.88 |
| Example 4 | −0.2 | 0.99 | 0.82 |
| Example 5 | −0.2 | 0.96 | 0.75 |
| Example 6 | −0.1 | 0.97 | 0.76 |
| Example 7 | −0.1 | 1.00 | 0.79 |
| Example 8 | −0.1 | 0.99 | 0.79 |
| Example 9 | −0.1 | 1.00 | 0.80 |
| Example 10 | −0.1 | 1.00 | 0.85 |
| Example 11 | −0.1 | 0.99 | 0.82 |
| Example 12 | −0.1 | 1.00 | 0.86 |
| Example 13 | −0.1 | 1.00 | 0.78 |
| Example 14 | −0.1 | 1.00 | 0.76 |
| Example 15 | −0.1 | 1.00 | 0.75 |
| Example 16 | −0.2 | 1.00 | 0.74 |
| Comparative Example 1 | −1.2 | 0.95 | 0.35 |
| Comparative Example 2 | −0.8 | 0.97 | 0.42 |
| Comparative Example 3 | −2.4 | 0.42 | 0.21 |
| Comparative Example 4 | −1.8 | 0.95 | 0.61 |
| Comparative Example 5 | −2.6 | 0.40 | 0.20 |
| Comparative Example 6 | −2.4 | 0.51 | 0.22 |
| Comparative Example 7 | −1.9 | 0.97 | 0.58 |

In the power generation test, wherein the sample was used as the cell material for a fuel cell, a cermet of Ni and $ZrO_2$ was used for the fuel pole anode, and $(LaSr)MnO_3$ was used for the air pole cathode. The electrode diameter was 15 mm, and the thickness of the solid electrolyte was 500 μm. While supplying oxygen to the air pole side cathode and moistened hydrogen gas to the fuel pole side anode, the power density was measured at 1,000° C. and 800° C., whereupon the maximum power densities were obtained.

In Table 2, the maximum power densities at 1000° C. and 800° C. are shown.

TABLE 2

| | maximum power density $(W/cm^2)$ | |
|---|---|---|
| | 800° C. | 1000° C. |
| Example 1 | 0.51 | 1.20 |
| Example 2 | 0.46 | 0.90 |
| Example 3 | 0.50 | 1.00 |
| Example 4 | 0.47 | 0.91 |
| Example 5 | 0.47 | 0.90 |

TABLE 2-continued

| | maximum power density (W/cm²) | |
|---|---|---|
| | 800° C. | 1000° C. |
| Example 6 | 0.50 | 0.89 |
| Example 7 | 0.51 | 0.91 |
| Example 8 | 0.50 | 0.91 |
| Example 9 | 0.50 | 0.92 |
| Example 10 | 0.51 | 1.02 |
| Example 11 | 0.51 | 1.00 |
| Example 12 | 0.50 | 1.04 |
| Example 13 | 0.49 | 0.87 |
| Example 14 | 0.49 | 0.85 |
| Example 15 | 0.49 | 0.84 |
| Example 16 | 0.47 | 0.81 |
| Comparative Example 1 | 0.009 | 0.04 |
| Comparative Example 2 | 0.01 | 0.07 |
| Comparative Example 3 | <0.001 | <0.001 |
| Comparative Example 4 | <0.001 | 0.008 |
| Comparative Example 5 | <0.001 | <0.001 |
| Comparative Example 6 | <0.001 | <0.001 |
| Comparative Example 7 | <0.001 | 0.08 |

In the Table, "<0.001" indicates that the power density was less than the detectable limit of the power density by the power generation test apparatus.

COMPARATIVE EXAMPLES 1 TO 7

To obtain blends corresponding to the following seven types of chemical formulas, yttrium oxide powder, samarium oxide powder, cesium carbonate powder, cerium oxide powder and lithium oxide powder were mixed in ethanol by a ball mill in the same manner as in Examples, and the blends were calcined at 1,000° C. for one hour in air. The powders thereby obtained were formed into pellets by cold isostatic press under 2 t/cm². The obtained samples were sintered at 1,500° C. for 4 hours in air to obtain test samples.

Comparative Example 1: $(Y_{0.3}Ce_{0.7})O_{1.85}$
Comparative Example 2: $(Sm_{0.3}Ce_{0.7})O_{1.85}$
Comparative Example 3: $\{(Y_{0.3}Cs_{0.7})_{0.3}Ce_{0.7}\}O_{2-y}$
Comparative Example 4: $\{(Y_{0.5}Cs_{0.5})_{0.5}(Ce_{0.67}Li_{0.33})_{0.5}\}O_{1.25}$
Comparative Example 5: $\{(Y_{0.5}Cs_{0.5})_{0.3}(Ce_{0.5}Li_{0.5})_{0.7}\}O_{2-y}$
Comparative Example 6: $\{(Sm_{0.3}Cs_{0.7})_{0.3}Ce_{0.7}\}O_{2-y}$
Comparative Example 7: $\{(Sm_{0.5}Cs_{0.5})_{0.5}(Ce_{0.67}Li_{0.33})_{0.5}\}O_{1.25}$ However, the oxygen number in each of the above formulas is the value calculated from the balance of the positive and negative charges.

The products of Comparative Examples 1 and 4 were composed of a fluorite single phase. However, the products of Comparative Examples 3 and 6 showed a mixed phase of cesium oxide and a fluorite compound. The product of Comparative Example 5 was a mixed phase state comprising a very small amount of lithium oxide and a fluorite compound. The products of Comparative Examples 3, 5 and 6 were not of a single phase, whereby the oxygen number was not clear, and therefore, they were shown as above.

The conductivity and the oxygen ion transport number at 950° C. of each sintered body thus obtained are also shown in Table 1.

According to the present invention, it is possible to provide a fluorite structure type ceria type solid electrolyte which has the ionic conductivity remarkably improved over the conventional electrolytes and which exhibits an excellent power density when it is used for a fuel cell.

The fluorite structure type ceria type solid electrolyte of the present invention has a large quantity of oxygen vacancies and is excellent in reducing resistance. Therefore, it is very useful also for industrial purposes.

We claim:

1. A defective fluorite structure solid electrolyte of the following formula (1):

$$\{(M_{1-a}A_a)_xCe_{1-x}\}O_{2-y} \quad (1)$$

wherein M is a trivalent rare earth element other than Ce, A is a monovalent alkali metal or a bivalent alkaline earth metal, and a, x and y are 0<a<0.6, 0.2<x<0.5 and 0<y<0.55, respectively.

2. The defective fluorite structure solid electrolyte according to claim 1, wherein M is an element having an ionic radius within a range of from 0.97 to 1.20 Å in eightfold coordination.

3. The defective fluorite structure solid electrolyte according to claim 1, wherein M is Y.

4. A defective fluorite structure solid electrolyte of the following formula (2):

$$\{(M_\alpha A_a)_xCe_{1-x}\}O_{2-y} \quad (2)$$

wherein M is a trivalent rare earth element other than Ce, A is a monovalent alkali metal or a bivalent alkaline earth metal, and α, a, x and y are 0.4<α<1, 0<a<0.1, 0.2<x<0.5 and 0<y<0.26, respectively.

5. The defective fluorite structure solid electrolyte according to claim 4, where M is an element having an ionic radius within a range of from 0.97 to 1.20 Å in eightfold coordination.

6. The defective fluorite structure solid electrolyte according to claim 4, wherein M is Y.

7. A defective fluorite structure solid electrolyte of the following formula (3):

$$\{(M_{1-a}A_a)_x(Ce_{1-b}B_b)_{1-x}\}O_{2-y} \quad (3)$$

wherein M is a trivalent rare earth element other than Ce, each of A and B is a monovalent alkali metal or a bivalent alkaline earth metal, provided A≠B, and a, x, b and y are 0<a<0.6, 0.1<x<0.4, 0<b<0.4 and 0<y<0.8, respectively.

8. The defective fluorite structure solid electrolyte according to claim 7, wherein M is an element having an ionic radius within a range from from 0.97 to 1.20 Å in eightfold coordination.

9. The defective fluorite structure solid electrolyte according to claim 7, wherein M is Y.

10. A defective fluorite structure solid electrolyte of the following formula (4):

$$\{(M_\alpha A_a)_x(Ce_\beta B_b)_{1-x}\}O_{2-y} \quad (4)$$

wherein M is a trivalent rare earth element other than Ce, each of A and B is a monovalent alkali metal or a bivalent alkaline earth metal, provided that A≠B, and α, a, x, β, b and y are 0.4<α<1, 0<a<0.1, 0.1<x<0.4, 0.6<β<1, 0<b<0.1 and 0<y<0.41, respectively.

11. The defective fluorite structure solid electrolyte according to claim 10, wherein M is an element having an ionic radius within a range of from 0.97 to 1.20 Å in eightfold coordination.

12. The defective fluorite structure solid electrolyte according to claim 10, wherein M is Y.

* * * * *